United States Patent
Chang et al.

(10) Patent No.: US 12,334,548 B2
(45) Date of Patent: *Jun. 17, 2025

(54) ANODELESS LITHIUM METAL BATTERY AND METHOD OF MANUFACTURING THE SAME

(71) Applicants: Samsung Electronics Co., Ltd., Suwon-si (KR); Samsung SDI Co., Ltd., Yongin-si (KR)

(72) Inventors: Wonseok Chang, Seoul (KR); Hyorang Kang, Anyang-si (KR); Soyeon Kim, Suwon-si (KR); Jirai Kim, Seoul (KR); Toshinori Sugimoto, Hwaseong-si (KR); Yonggun Lee, Suwon-si (KR); Dongmin Im, Seoul (KR); Shintaro Kitajima, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 45 days.

This patent is subject to a terminal disclaimer.

(21) Appl. No.: 17/749,372

(22) Filed: May 20, 2022

(65) Prior Publication Data

US 2022/0278357 A1 Sep. 1, 2022

Related U.S. Application Data

(63) Continuation of application No. 16/236,867, filed on Dec. 31, 2018, now Pat. No. 11,349,148.

(30) Foreign Application Priority Data

Jan. 5, 2018 (KR) .......................... 10-2018-0001850

(51) Int. Cl.
*H01M 4/38* (2006.01)
*H01M 4/13* (2010.01)
(Continued)

(52) U.S. Cl.
CPC ............ *H01M 4/382* (2013.01); *H01M 4/13* (2013.01); *H01M 4/405* (2013.01); *H01M 4/74* (2013.01);
(Continued)

(58) Field of Classification Search
CPC ................ H01M 4/405; H01M 4/382; H01M 10/0569; H01M 50/457; H01M 50/431;
(Continued)

(56) References Cited

U.S. PATENT DOCUMENTS 6,402,795 B1 6/2002 Chu et al.
7,901,468 B2 3/2011 Harada et al.
(Continued)

FOREIGN PATENT DOCUMENTS

CN 105390743 A 3/2016
CN 106340651 A 1/2017
(Continued)

OTHER PUBLICATIONS

Japanese Office Action for Japanese Patent Application No. 2018-247277 dated Dec. 23, 2022.
(Continued)

*Primary Examiner* — Laura Weiner
(74) *Attorney, Agent, or Firm* — CANTOR COLBURN LLP

(57) ABSTRACT

An anodeless lithium metal battery includes: a cathode including a cathode current collector and a cathode active material layer on the cathode current collector; an anode current collector on the cathode; and a composite electrolyte between the cathode and the anode current collector,
(Continued)

wherein the composite electrolyte includes a first liquid electrolyte and at least one of lithium metal or a lithium metal alloy.

19 Claims, 6 Drawing Sheets

(51) Int. Cl.
| | |
|---|---|
| *H01M 4/40* | (2006.01) |
| *H01M 4/74* | (2006.01) |
| *H01M 10/052* | (2010.01) |
| *H01M 10/056* | (2010.01) |
| *H01M 10/0569* | (2010.01) |
| *H01M 10/0585* | (2010.01) |
| *H01M 50/417* | (2021.01) |
| *H01M 50/431* | (2021.01) |
| *H01M 50/457* | (2021.01) |
| *H01M 4/02* | (2006.01) |
| *H01M 10/0568* | (2010.01) |

(52) U.S. Cl.
CPC ....... *H01M 10/052* (2013.01); *H01M 10/056* (2013.01); *H01M 10/0569* (2013.01); *H01M 10/0585* (2013.01); *H01M 50/417* (2021.01); *H01M 50/431* (2021.01); *H01M 50/457* (2021.01); *H01M 2004/027* (2013.01); *H01M 10/0568* (2013.01); *H01M 2300/002* (2013.01); *H01M 2300/0025* (2013.01); *H01M 2300/0034* (2013.01); *H01M 2300/0068* (2013.01); *H01M 2300/0082* (2013.01); *H01M 2300/0085* (2013.01); *H01M 2300/0091* (2013.01); *H01M 2300/0094* (2013.01)

(58) Field of Classification Search
CPC ............. H01M 4/366; H01M 10/0568; H01M 10/0562; H01M 2300/0068; H01M 2300/0065; H01M 2300/0071; H01M 4/74; H01M 50/409; H01M 50/411; H01M 50/417; H01M 2300/0025; H01M 2300/0034; H01M 4/13
See application file for complete search history.

(56) References Cited

U.S. PATENT DOCUMENTS

| | | | |
|---|---|---|---|
| 7,968,233 B2 | 6/2011 | Nelson et al. | |
| 9,093,707 B2 | 7/2015 | Lee et al. | |
| 11,133,532 B2 * | 9/2021 | Chang ................... | H01M 4/382 |
| 11,349,148 B2 * | 5/2022 | Chang ................. | H01M 10/052 |
| 11,355,778 B2 | 6/2022 | Chang et al. | |
| 2005/0239917 A1 | 10/2005 | Nelson et al. | |
| 2006/0110661 A1 | 5/2006 | Lee et al. | |
| 2011/0003211 A1 | 1/2011 | Hudson et al. | |
| 2015/0079485 A1 | 3/2015 | Choi et al. | |
| 2016/0064770 A1 | 3/2016 | Lee et al. | |
| 2016/0126543 A1 | 5/2016 | Ota et al. | |
| 2016/0181585 A1 | 6/2016 | Choi et al. | |
| 2016/0261000 A1 | 9/2016 | Zhang et al. | |
| 2016/0351952 A1 | 12/2016 | Ohtomo et al. | |
| 2017/0062829 A1 | 3/2017 | Ryu et al. | |
| 2017/0093002 A1 | 3/2017 | Choi et al. | |
| 2017/0324097 A1 | 11/2017 | Lee et al. | |
| 2018/0040904 A1 | 2/2018 | Choi et al. | |
| 2018/0323467 A1 | 11/2018 | Tang et al. | |
| 2020/0106094 A1 | 4/2020 | Ota et al. | |
| 2021/0083291 A1 | 3/2021 | Lee et al. | |
| 2022/0278357 A1 | 9/2022 | Chang et al. | |

FOREIGN PATENT DOCUMENTS

| | | |
|---|---|---|
| CN | 106486699 A | 3/2017 |
| CN | 110010954 A | 7/2019 |
| CN | 115207519 A | 10/2022 |
| EP | 3136475 A1 | 3/2017 |
| JP | 2000228185 A | 8/2000 |
| JP | 2011065841 A | 3/2011 |
| JP | 2017-534164 A | 11/2017 |
| KR | 20010064617 A | 7/2001 |
| KR | 20030095578 A | 12/2003 |
| KR | 0582557 B1 | 5/2006 |
| KR | 20160026648 A | 3/2016 |
| KR | 2017-0026098 A | 3/2017 |
| KR | 2017-0124075 A | 11/2017 |
| KR | 2017-0126404 A | 11/2017 |
| WO | 2017143274 A1 | 8/2017 |
| WO | 2017146357 A1 | 8/2017 |
| WO | 2017214276 A1 | 12/2017 |
| WO | WO 2018-236166 * | 6/2018 |

OTHER PUBLICATIONS

Kai Yan et al. "Selective deposition and stable encapsulation of lithium through heterogeneous seeded growth", Nature Energy, Feb. 22, 2016, pp. 1-8.
Mihai Duduta et al., "Semi-Solid Lithium Rechargeable Flow Battery", Advanced Energy Materials, May 20, 2011, pp. 511-516, vol. 1.
English Translation of Office Action dated Nov. 16, 2023, issued in corresponding CN Patent Application No. 201910006997.4, 6 pp.
dated Nov. 17, 2023, issued in corresponding CN Patent Application No.
English Translation of Office Action 201910006968.8, 7 pp.
Office Action for Japanese Patent Application No. 2018-247277 dated Dec. 23, 2022.
Action dated Nov. 16, 2023, issued in corresponding CN Patent Application No. 201910006997.4, 6 pp.
Office Action dated Nov. 17, 2023, issued in corresponding CN Patent Application No. 201910006968.8, 6 pp.

* cited by examiner

ANODELESS LITHIUM METAL BATTERY AND METHOD OF MANUFACTURING THE SAME

CROSS-REFERENCE TO RELATED APPLICATION

This application is continuation of U.S. patent application Ser. No. 16/236,867, filed on Dec. 31, 2018, now U.S. Pat. No. 11,349,148, which claims priority to and the benefit of Korean Patent Application No. 10-2018-0001850, filed on Jan. 5, 2018, in the Korean Intellectual Property Office, and all the benefits accruing therefrom under 35 U.S.C. § 119, the contents of which are incorporated herein by reference in their entirety.

BACKGROUND

1. Field

The present disclosure relates to an anodeless lithium metal battery and a method of manufacturing the same.

2. Description of the Related Art

A lithium secondary battery is a high-performance battery having the highest energy density as compared to other currently available secondary batteries, and are applicable to various fields such as electric vehicles.

A lithium secondary battery may use a lithium metal thin film as an anode. A lithium metal thin film may be formed by roll-pressing lithium into a planar form. However, a lithium secondary battery using a lithium metal thin film as the anode may have insufficient energy density and lifetime characteristics due to the formation and growth of dendrites on the lithium metal thin film. Therefore, there is a need for an improved anode material.

SUMMARY

Provided is an anodeless lithium metal battery having improved energy density.

Provided is a method of manufacturing the anodeless lithium metal battery.

Additional aspects will be set forth in part in the description which follows and, in part, will be apparent from the description, or may be learned by practice of the presented embodiments.

According to an aspect of an embodiment, an anodeless lithium metal battery includes: a cathode including a cathode current collector and a cathode active material layer on the cathode current collector; an anode current collector on the cathode; and a composite electrolyte between the cathode and the anode current collector, wherein the composite electrolyte includes a first liquid electrolyte and a metal including at least one of lithium metal or a lithium metal alloy.

According to an aspect of another embodiment, a method of manufacturing the anodeless lithium metal battery includes: combining a metal including at least one of lithium metal or a lithium metal alloy with the first liquid electrolyte to prepare a composite electrolyte composition; coating the composite electrolyte composition on the anode current collector; drying the coated composite electrolyte composition to prepare the composite electrolyte; and disposing the anode current collector and the composite electrolyte on the cathode including the cathode active material layer on a cathode current collector to manufacture the anodeless lithium metal battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
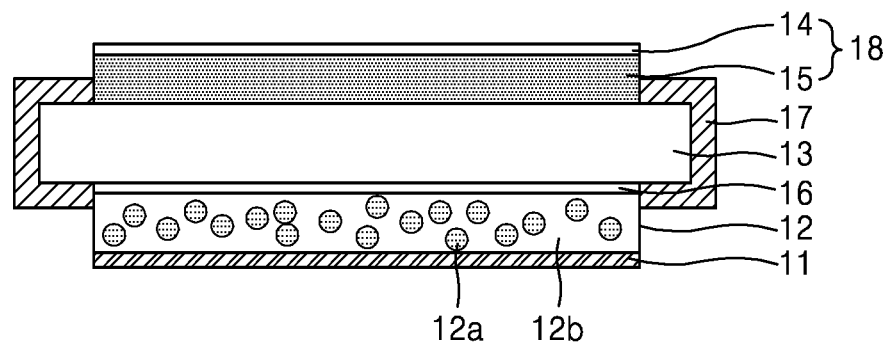
FIG. 1A is a schematic view illustrating a structure of an embodiment of an anodeless lithium metal battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." As used herein, the term "and/or" includes any and all combinations of one or more of the associated listed items. Expressions such as "at least one of," when preceding a list of elements, modify the entire list of elements and do not modify the individual elements of the list.

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an embodiment of an anodeless lithium metal battery and a method of manufacturing the anodeless lithium metal battery will be described in greater detail.

In accordance with an aspect of the disclosure, an anodeless lithium metal battery includes: a cathode current collector; a cathode including a cathode active material layer; an anode current collector; and a composite electrolyte including a first liquid electrolyte and at least one of lithium metal or a lithium metal alloy.

In a lithium metal battery using a lithium metal thin film as an anode, a dead volume of lithium may be generated in the battery due to a lithium dendrite on the lithium metal thin film. While not wanting to be bound by theory, it is understood that the dendrite forms and grows after during charge and discharge. The formation of the lithium dendrite is understood to lead to a loss of electrochemically active lithium, and consequently reducing the lifetime and capacity characteristics of the lithium metal battery. In addition, because the lithium metal thin film is planar in form, the lithium metal thin film may swell only in an upper or lower portion of the electrode during charge. As a result, it may be difficult to control the volume expansion of the lithium metal battery during charge and discharge within a desired range.

To solve this problem, the inventors have advantageously discovered that use of an anode current collector without a planar lithium metal thin film, together with a composite electrolyte comprising at least one of lithium metal or a lithium metal alloy, and a liquid electrolyte, results in improved energy density and charge-discharge efficiency of a lithium metal battery. While not wanting to be bound by theory, it is understood that in the anodeless lithium metal battery according to an embodiment, an individual metal particle of the lithium metal or lithium metal alloy in the composite electrolyte may freely expand, so that the above-described drawbacks associated with the lithium metal battery including a lithium metal thin film are avoided.

As used herein, the term "anodeless lithium metal battery" refers to a lithium metal battery which does not include an anode active material on the anode current collector before the first charge. In further detail, the disclosed anodeless lithium metal battery: i) does not include an anode active material, such as graphite, that would intercalate and deintercalate lithium ions, ii) has, on an anode current collector when the battery is assembled or after a first charge, a lithium metal thin film or a lithium alloy thin film as an anode having a thickness of about 10% or less with respect to a thickness of a cathode, and iii) does not include an anode active material layer when the battery is assembled and before the first charge. The expression "thickness of the anode" may refer to a total thickness of the anode current collector and the anode active material layer. Thus while the anodeless lithium metal battery has a negative electrode, the term "anodeless" is used because when manufactured a distinct anode active material is not present.

An anodeless lithium metal battery according to an embodiment will be further described with reference to FIGS. 1A and 1B. FIG. 1A is a schematic view illustrating a structure of an anodeless lithium metal battery and FIG. 1B is an illustration showing the structures of a solid electrolyte 13, a composite electrolyte 12, and an anode current collector 11 in the anodeless lithium metal battery of FIG. 1A.

Referring to FIG. 1A, the anodeless lithium metal battery according to an embodiment may include the composite electrolyte 12 on the anode current collector 11. As noted above, a planar lithium metal thin film is not used in the manufacture of the anodeless lithium metal battery. The composite electrolyte 12 comprises a metal, e.g., a metal particle 12a, which comprises at least one of lithium metal or a lithium metal alloy, which is distributed or dispersed in a first liquid electrolyte 12b.

Figure 1B:
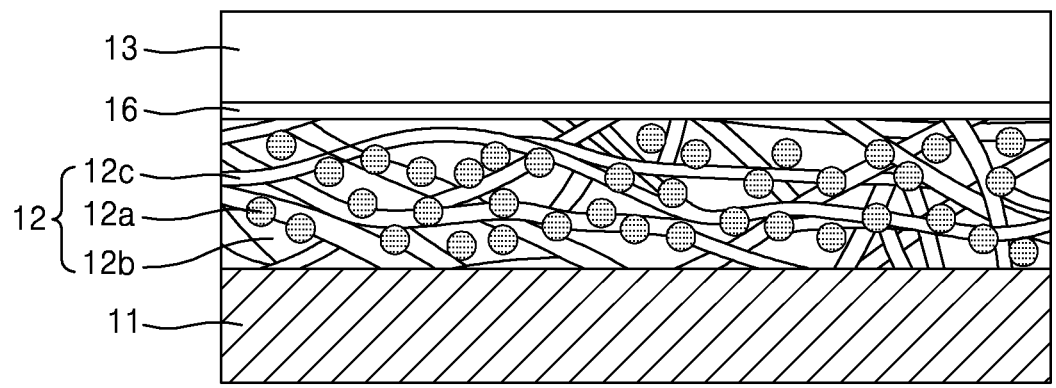
FIG. 1B illustrates structure of an embodiment of a composite electrolyte and an embodiment of a solid electrolyte in the anodeless lithium metal battery of FIG. 1A.

The composite electrolyte 12 may further include a non-woven fabric 12c, as illustrated in FIG. 1B. The non-woven fabric 12c may support the metal particle 12a of a lithium metal and/or a lithium metal alloy. The non-woven fabric 12c may be omitted. For example, when the anode current collector 11 is a mesh-type, the non-woven fabric 12c may not be present.

The first liquid electrolyte 12b may be uniformly distributed in the composite electrolyte 12. The first liquid electrolyte 12b may include a lithium salt and an organic solvent. A concentration of the lithium salt may be about 1 molar (M)

to about 8 M, and in some embodiments, about 2 M to about 5 M, and in some other embodiments, about 2 M to about 4 M.

The first liquid electrolyte 12b may be, for example, a high-concentration electrolyte solution, for example, a solution including a high-concentration of the lithium salt. For example, the high-concentration electrolyte solution may be an electrolyte solution containing a lithium salt in a concentration of about 1 M to about 8 M, and in some embodiments, about 2 M to about 5 M, and in some other embodiments, about 2 M to 4 M.

Referring to FIG. 1A, a cathode 18 may include a cathode current collector 14 and a cathode active material layer 15 disposed on the cathode current collector 14. The cathode active material layer 15 may include a cathode active material and a second liquid electrolyte. A solid electrolyte 13 may be disposed between the cathode 18 and the composite electrolyte 12 such that the cathode 18 and the composite electrolyte 12 are separated from one another.

The solid electrolyte 13 may block the second liquid electrolyte in the cathode 18 from migrating toward the composite electrolyte 12, or the first liquid electrolyte in the composite electrolyte 12 from migrating toward the cathode 18.

A porous polymer membrane 16 may be disposed between the solid electrolyte 13 and the composite electrolyte 12 such that direct contact between the solid electrolyte 13 and the composite electrolyte 12 is prevented. The porous membrane 16, though illustrated in both of FIGS. 1A and 1B, may be omitted. Referring to FIG. 1A, a barrier 17 for protecting the solid electrolyte 13 may be included. The barrier 17 may have any suitable structure, not limited to the structure of FIG. 1A, provided that it sufficiently protects the solid electrolyte 13. The barrier 17 may comprise, for example, a material of a battery case, e.g., a metallized film as used for a case of a pouch cell.

The solid electrolyte 13 may separate the composite electrolyte 12 from the cathode 18. Because the solid electrolyte 13 separates the composite electrolyte 12 from the cathode 18, the anodeless lithium metal battery according to an embodiment may be manufactured as a separate cell type battery. The separate cells may be used as dual chamber cells. The solid electrolyte 13 may allow only lithium ions to pass through, and blocks the passage or permeation of liquid, for example.

The solid electrolyte 13 may be an inorganic solid electrolyte, an organic solid electrolyte, or an organic/inorganic composite electrolyte. The organic solid electrolyte may include, for example, at least one of a polyethylene derivative, a polyethylene oxide derivative, a polypropylene oxide derivative, a phosphoric acid ester polymer, polyester sulfide, polyvinyl alcohol, or polyvinylidene fluoride. The inorganic solid electrolyte may include, for example, at least one of a glassy active metal ionic conductor, an amorphous active metal ionic conductor, a ceramic active metal ionic conductor, or a glass-ceramic active metal ionic conductor. The organic/inorganic composite electrolyte may be, for example, a combination of an organic solid electrolyte and an inorganic solid electrolyte as listed above.

The solid electrolyte 13 may comprise at least one of $Li_{1+x}Ti_{2-x}Al(PO_4)_3$ (LTAP) (wherein $0 \leq x \leq 4$), a Li—Ge—P—S-based material, $Li_{1+x+y}Al_xTi_{2-x}Si_yP_{3-y}O_{12}$ (wherein $0<x<2$ and $0 \leq y<3$), $BaTiO_3$, $Pb(Zr_{1-x}Ti_x)O_3$ wherein $0 \leq x \leq 1$ (PZT), $Pb_{1-x}La_xZr_{1-y}Ti_yO_3$ (PLZT) (wherein $0 \leq x<1$ and $0 \leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, wherein $0<x<2$, and $0<y<3$), lithium aluminum titanium phosphate ($Li_xAl_yTi_z(PO_4)_3$, wherein $0<x<2$, $0<y<1$, and $0<z<3$), $Li_{1+x+y}(Al_{1-a}Ga_a)_x(Ti_{1-b}Ge_b)_{2-x}Si_yP_{3-y}O_{12}$ (wherein $0 \leq x \leq 1$, $0 \leq y \leq 1$, $0 \leq a \leq 1$, $0 \leq b \leq 1$), lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$ and $0<y<2$), a $SiS_2$ ($Li_xSi_yS_z$, wherein $0<x<3$, $0<y<2$, and $0<z<4$) glass, a $P_2S_5$ glass ($Li_xP_yS_z$, wherein $0<x<3$, $0<y<3$, and $0<z<7$), $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, $Li_xAl_yTi_z(PO_4)_3$, wherein $0<x<2$, $0<y<1$, and $0<z<3$, or a garnet ceramic such as $Li_{3+x}La_3M_2O_{12}$, wherein $0 \leq x \leq 5$ and M is Te, Nb, or Zr.

The solid electrolyte 13 may comprise at least one of $Li_{1.4}Ti_{1.6}Al_{0.4}P_3O_{12}$, $Li_{1.3}Ti_{1.7}Al_{0.3}P_3O_{12}$, $Li_{10}GeP_2S_{12}$, $Li_7La_3Zr_2O_{12}$ (LLZ), lithium phosphorous oxynitride (LiPON), $Li_5La_3Ta_2O_{12}$, $Li_{0.33}La_{0.55}TiO_3$, $Li_{1.5}Al_{0.5}Ge_{1.5}P_3O_{12}$, $Li_3BO_3$, $Li_4SiO_4$—$Li_3PO_4$, $Li_4SiO_4$, $Li_{1/3}La_{1/3}TiO_3$, or $Li_2O$—$Al_2O_3$—$SiO_2$—$P_2O_5$—$TiO_2$—$GeO_2$.

The solid electrolyte 13 may be in the form of a membrane, and may have a thickness of about 10 micrometers (μm) to about 150 μm, and in some embodiments, about 15 μm to about 90 μm, and in some other embodiments, about 20 μm to about 50 μm.

The non-woven fabric 12c, as shown in FIG. 1B, may have a porosity of about 10% to about 90%, and in some embodiments, about 10% to about 80%, and in some other embodiments, about 10% to about 50%, and in some other embodiments, about 25% to about 50%, based on a total volume of the non-woven fabric, and may have an average pore size of about 0.1 μm to about 10 μm, and in some embodiments, about 0.1 μm to about 8 μm, and in some other embodiments, about 0.1 μm to about 1.0 μm. As used herein, the term "average pore size" may refer to an average diameter of a pore when the pores are spherical in shape, or may refer to a length of the longer axis of a pore when the pores are non-spherical. The pore size may be determined by microscopy, for example.

The non-woven fabric 12c may comprise at least one of cellulose, a polyester (for example, polyethylene terephthalate (PET), polybutylene terephthalate (PBT), or polyethylene naphthalate (PEN)), polyetherimide, polyethylene, polypropylene, polyamide (e.g., nylon), polyacetal, polycarbonate, polyimide, polyether ketone, polyether sulfone, polyphenylene oxide, polyphenylene sulfide, polytetrafluoroethylene, polyvinylidene fluoride, polyvinyl chloride, polyacrylonitrile, or polypara-phenylene benzobisoxazole.

The porous polymer membrane 16 may have a thickness of about 5 μm to about 30 μm, and in some embodiments, about 10 μm to about 20 μm or about 10 μm to about 15 μm. The porous polymer membrane 16 may comprise at least one of a polyethylene membrane, a polypropylene membrane, a polyester membrane such as a polyethylene terephthalate membrane, a polybutylene terephthalate membrane, or a polyethylene naphthalate membrane, a polyacetal membrane, a polyamide membrane, a polycarbonate membrane, a polyimide membrane, a polyether ketone membrane, a polyether sulfone membrane, a polyphenylene oxide membrane, or a polyphenylene sulfide membrane.

Figure 1C:
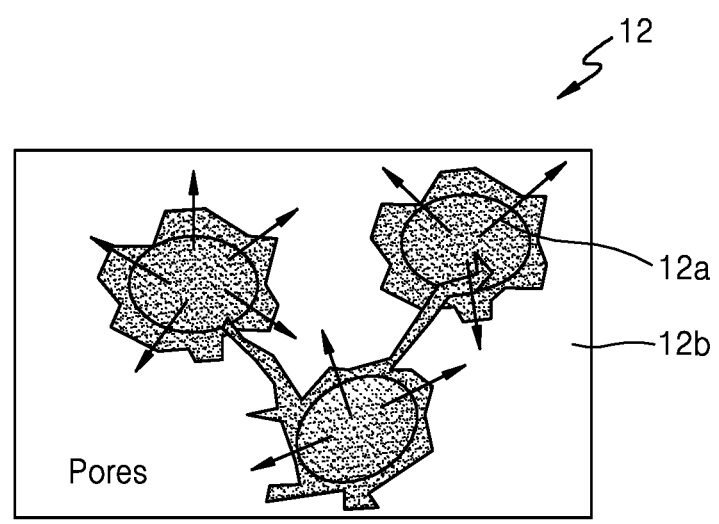
FIG. 1C illustrates a detailed structure of an embodiment of a lithium metal particle in the composite electrolyte, and illustrates an expansion mechanism of the lithium metal particle in the composite electrolyte.

FIG. 1C is an illustration of a detailed structure of a metal particle 12a in the composite electrolyte 12 according to an embodiment, for explaining an expansion mechanism of the metal particle in the composite electrolyte. Referring to FIG.

1C, in the anodeless lithium metal battery according to an embodiment, the metal particle 12a of at least one of lithium metal or a lithium metal alloy in the composite electrolyte 12 including the first liquid electrolyte 12b, may be present in the form of an independent metal particle and thus may freely expand in a radial direction, thereby preventing the loss of lithium during charge and discharge.

In a lithium metal battery including a lithium metal thin film, deposition of lithium ions occurs on the lithium metal thin film during charge. However, and without being limited by theory, it is believed that in the disclosed lithium metal battery the composite electrolyte 12 may release a lithium ion during discharge, and the lithium ion may migrate to the at least one of lithium metal or a lithium metal alloy in the composite electrolyte 12 during charge, and then be electrodeposited on a surface of the at least one of lithium metal and a lithium metal alloy. Through these processes the at least one of lithium metal or a lithium metal alloy may form an interconnected structure, and this interconnected structure may be bound to and/or disposed on a surface of the anode current collector 11.

In an embodiment, the first liquid electrolyte of the composite electrolyte and the second liquid electrolyte of the cathode may be different from one another. When the compositions of the first liquid electrolyte and the second liquid electrolyte are different from each other, the compositions of the first and second liquid electrolytes may be independently selected, e.g., to compensate for any electrochemical disadvantages of the anodeless lithium metal battery, such as high-voltage oxidation and electrolyte loss due to dendrite growth.

The first liquid electrolyte and the second liquid electrolyte may each independently include at least one of an ionic liquid and a polymer ionic liquid (PIL).

The ionic liquid may be an ionic material in a molten (i.e., liquid) state at room temperature (25° C.), and which includes a cation and an anion. For example, the ionic liquid may include a cation comprising at least one of an imidazolium cation, an ammonium cation, a pyrrolidinium cation, or a piperidinium cation. However, embodiments are not limited thereto. For example, the ionic liquid may include an anion comprising at least one of bis(fluorosulfonyl)imide, fluorosufonylamide, fluoroborate, or a fluorophosphate. However, embodiments are not limited thereto. Non-limiting examples of the cation include an alkyl ammonium such as triethyl ammonium, an imidazolium such as ethyl methyl imidazolium or butyl methyl imidazolium, a pyrrolidium such as 1-methyl-1-propylpyrrolidium, or methyl propylpiperidium. A combination comprising at least one of the foregoing cations may be used. Non-limiting examples of the anion include bis(trifluoromethylsulfonyl)imide (TFSI), bis(pentafluoroethylsufonyl)imide (BETI), tetrafluoroborate ($BF_4$), and orthohexafluorophosphate ($PF_6$). A combination comprising at least one of the foregoing anions may be used.

The ionic liquid may be, for example, [emim]Cl/$AlCl_3$ (wherein emim is ethyl methyl imidazolium), [bmpyr]$NTf_2$ (wherein bmpyr is butyl methyl pyridinium and $NTf_2$=bis (trifluoromethanesulfonyl)imide), [bpy]Br/$AlCl_3$ (wherein bpy is 4,4'-bipyridine), [choline]Cl/$CrCl_3$.$6H_2O$, [emim] OTf/[hmim]I (wherein hmim is hexyl methyl imidazolium), [choline]Cl/$HOCH_2CH_2OH$, [$Et_2MeN(CH_2CH_2OMe)$]$BF_4$ (wherein Et is ethyl, Me is methyl, Pr is propyl, Bu is butyl, Ph is phenyl, Oct is octyl, and Hex is hexyl), [$Bu_3PCH_2CH_2C_8F_{17}$]OTf (wherein OTf is trifluoromethane sulfonate), [bmim]$PF_6$ (wherein bmim is butyl methyl imidazolium), [bmim]$BF_4$, [omim]$PF_6$ (wherein omim is octyl methyl imidazolium), [$Oct_3PC_{18}H_{37}$]I, [$NC(CH_2)_3$ mim]$NTf_2$ (wherein mim is methyl imidazolium), [$Pr_4N$][B $(CN)_4$], [bmim]$NTf_2$, [bmim]Cl, [bmim][Me($OCH_2CH_2$)$_2$ $OSO_3$], [$PhCH_2$mim]OTf, [$Me_3NCH(Me)CH(OH)Ph$]$NTf_2$, [pmim][$(HO)_2PO_2$] (wherein pmim is propyl methyl imidazolium), [(6-Me)bquin]$NTf_2$ (wherein bquin is butyl quinolinium, [bmim][$Cu_2Cl_3$], [$C_{18}H_{37}OCH_2$mim]$BF_4$ (wherein mim is methyl imidazolium), [heim]$PF_6$ (wherein heim is hexyl ethyl imidazolium), [mim($CH_2CH_2O$)$_2$ $CH_2CH_2$mim][$NTf_2$]$_2$ (wherein mim is methyl imidazolium), [obim]$PF_6$ (wherein obim is octyl butyl imidazolium), [oquin]$NTf_2$ (wherein oquin is octyl quinolinium), [hmim] [$PF_3(C_2F_5)_3$], [$C_{14}H_{29}$mim]Br (wherein mim is methyl imidazolium), [$Me_2N(C_{12}H_{25})_2$]$NO_3$, [emim]$BF_4$, [MeN ($CH_2CH_2OH$)$_3$], [$MeOSO_3$], [$Hex_3PCl_4H_{29}$]$NTf_2$, [emim] [$EtOSO_3$], [choline][ibuprofenate], [emim]$NTf_2$, [emim] [$(EtO)_2PO_2$], [emim]Cl/$CrCl_2$, or [$Hex_3PCl_4H_{29}$]$N(CN)_2$. However, embodiments are not limited thereto. Any suitable material that may be used as the ionic liquid in the art may be used.

Unless specified otherwise, emim is ethyl methyl imidazolium, bmpyr is butyl methyl pyridinium, bpy is 4,4'-bipyridine, hmim is hexyl methyl imidazolium, Et is ethyl, Me is methyl, Pr is propyl, Bu is butyl, Ph is phenyl, Oct is octyl, Hex is hexyl, obim is octyl butyl imidazolium, bmim is butyl methyl imidazolium, omim is octyl methyl imidazolium, mim is methyl imidazolium, pmim is propyl methyl imidazolium, bquin is butyl quinolinium, mim is methyl imidazolium, heim is hexyl ethyl imidazolium), and oquin is octyl quinolinium.

The polymer ionic liquid may be a polymeric ionic compound consisting of an organic cation including an imidazolium group, and at least one of an organic or inorganic anion. The cation of the polymer ionic liquid may include at least one of poly(1-vinyl-3-alkylimidazolium), poly(1-allyl-3-alkylimidazolium), or poly(1-(meth)acryloyloxy-3-alkylimidazolium), each wherein the alkyl group may have 1 to 6 carbon atoms. The anion of the polymer ionic liquid may include at least one of $CH_3COO^-$, $CF_3COO^-$, $CH_3SO_3$, $CF_3SO_3$, $(CF_3SO_2)_2N^-$, $(CF_3SO_2)_3C^-$, $(CF_3CF_2SO_2)_2N^-$, $C_4F_9SO_3^-$, $C_3F_7COO^-$, or $(CF_3SO_2)$ $(CF_3CO)N^-$.

The polymer ionic liquid may be, for example, at least one of poly(1-vinyl-3-alkylimidazolium), poly(1-allyl-3-alkylimidazolium), or poly(1-(meth)acryloyloxy-3-alkylimidazolium), each wherein the alkyl group may have 1 to 6 carbon atoms. The anion of the polymer ionic liquid may include at least one of $CH_3COO—$, $CF_3COO—$, $CH_3SO_3$, $CF_3SO_3$, $(CF_3SO_2)_2N^-$, $(CF_3SO_2)_3C^-$, $(CF_3CF_2SO_2)_2N^-$, $C_4F_9SO_3^-$, $C_3F_7COO^-$, or $(CF_3SO_2)(CF_3CO)N^-$.

The metal particle of lithium metal or a lithium metal alloy may have a size of about 5 micrometers (μm) to about 50 μm, and in some embodiments, about 10 μm to about 50 μm, or about 10 μm to about 30 μm. As used herein, the term "size" may refer to an average particle diameter when the metal particle is in the form of a spherical particle, or may refer to a length of the longest axis when the metal particle is in the form of non-spherical particles.

The metal particle may be at least one of a lithium metal powder or a lithium metal alloy powder.

The size of the particle may be measured by laser diffraction particle size distribution analysis (i.e., laser diffraction scattering). In an embodiment the metal particle may have a coating on the lithium metal or lithium metal alloy.

The metal particle may be treated so as to have a coating layer that is stable in air on a core of the lithium metal or lithium metal alloy particle. When the particle comprises a coating layer, the average particle diameter of the metal particle refers to the size of the lithium metal and/or lithium metal alloy core without the coating layer.

The coating layer may be formed by coating the metal particle with, for example, a coating material including an organic rubber such as nitrile butadiene rubber (NBR) or styrene butadiene rubber (SBR), an organic resin such as an ethylene vinyl alcohol (EVA) copolymer resin, or an inorganic compound, for example, a metal carbonate such as $Li_2CO_3$ or a metal oxide such as $Li_2O$. A combination comprising at least one of the foregoing coating materials may be used. When the metal particle has such a coating layer, it may be possible to prevent highly reactive lithium (Li) from reacting with moisture present in the air or a solvent and/or moisture present in a dispersion medium.

The lithium metal alloy may include lithium (Li), and at least one of Si, Sn, Al, Ge, Pb, Bi, Sb, Mg, In, Ca, Ti, V, a Si—Y' alloy (wherein Y' may be at least one of an alkaline metal, an alkaline earth metal, a Group 13 to Group 16 element, a transition metal, or a rare earth element, but is not Si), a Sn—Y' alloy (wherein Y' may be at least one of an alkaline metal, an alkaline earth metal, a Group 13 to Group 16 element, a transition metal, or a rare earth element, but is not Sn), or $MnO_x$ (wherein $0<x\leq2$). For example, the lithium metal alloy may be a lithium-aluminum (Li—Al) alloy, a lithium-magnesium alloy, a lithium-tin alloy, a lithium-indium alloy, a lithium-calcium alloy, a lithium-titanium alloy, or a lithium-vanadium alloy.

A content of the metal particle may be about 1 part by weight to about 50 parts by weight, and in some embodiments, about 5 parts by weight to about 40 parts by weight, and in some other embodiments, about 15 parts by weight to about 30 parts by weight, with respect to 100 parts by weight of a total weight of the composite electrolyte.

When the amount of the metal particle is within these ranges, the anodeless lithium metal battery may have improved initial efficiency and capacity characteristics. In the anodeless lithium metal battery according to one or more embodiments, separately coating an anode active material on the anode current collector can be omitted, and as a result, an energy density may be increased by controlling the amount of the metal particle added to the first liquid electrolyte.

The first organic solvent of the first liquid electrolyte may include at least one selected from a glyme compound, a ether compound, a dioxolane compound, a fluorinated ether compound, or a sulfone compound. The second liquid electrolyte may include any of the above-listed organic solvents of the first liquid electrolyte, and/or a carbonate compound.

For example, the glyme compound may comprise at least one of ethylene glycol dimethylether(1,2-dimethoxyethane), ethylene glycol diethylether(1,2-diethoxyethane), propylene glycol dimethylether, propylene glycol diethylether, butylene glycol dimethylether, butylene glycol diethylether, diethylene glycol dimethylether, triethylene glycol dimethylether, tetraethylene glycol dimethylether, diethylene glycol diethylether, triethylene glycol diethylether, tetraethylene glycol diethylether, dipropylene glycol dimethylether, tripropylene glycol dimethylether, tetrapropylene glycol dimethylether, dipropylene glycol diethylether, tripropylene glycol diethylether, tetrapropylene glycol diethylether, dibutylene glycol dimethylether, tributylene glycol dimethylether, tetrabutylene glycol dimethylether, dibutylene glycol diethylether, tributylene glycol diethylether, or tetrabutylene glycol diethylether. For example, the fluorinated ether compound may be at least one of 1,1,2,2-tetrafluoroethyl 2,2,3,3-tetrafluoropropyl ether, or 2,2,3,3,4,4,5,5-octafluoropentyl 1,1,2,2-tetrafluoroethyl ether.

The dioxolane compound may include, for example, at least one of 1,3-dioxolane, 4,5-dimethyl-1,3-dioxolane, 4,5-diethyl-1,3-dioxolane, 4-methyl-1,3-dioxolane, 4-ethyl-1,3-dioxolane, 2-methyl-1,3-dioxolane, 2-vinyl-1,3-dioxolane, 2,2-dimethyl-1,3-dioxolane, or 2-ethyl-2-methyl-1,3-dioxolane.

The sulfone compound may include, for example, at least one of dimethyl sulfone, diethyl sulfone, or ethylmethyl sulfone.

The carbonate compound may include, for example, at least one of ethylene carbonate, propylene carbonate, dimethyl carbonate, diethyl carbonate, butylene carbonate, ethylmethyl carbonate, fluoroethylene carbonate, methylpropyl carbonate, ethylpropyl carbonate, methylisopropyl carbonate, dipropyl carbonate, or dibutyl carbonate.

The first organic solvent may be include, for example, a fluorinated ether compound.

The amount of the fluorinated ether compound may be about 50 vol. % or less, and in some embodiments, about 0.1 vol. % to about 50 vol. %, and in some other embodiments, about 1 vol. % to about 30 vol. %, or about 5 vol % to about 25 vol %, based on a total amount of the first organic solvent.

The fluorinated ether compound has a high flash point of about 80° C. or greater and excellent flame retardancy. When such a fluorinated ether compound is used as an organic solvent for a liquid electrolyte, an anodeless lithium metal battery having improved high-temperature stability may be manufactured. The fluorinated ether compound has a structure in which fluorinated functional groups are bonded to a —$CH_2$—O— moiety, and has a small polarity. Thus, the fluorinated ether compound may have excellent miscibility with an ether solvent capable of solvating lithium ions and having high dissolution capability, such as dimethyl ether (DME).

The fluorinated ether compound represented by Formula 1 may be at least one of $HCF_2CF_2CH_2OCF_2CF_2H$, $HCF_2CF_2CH_2OCF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2CF_2H$, $HCF_2CF_2OCH_2CH_2OCF_2CF_2CF_2H$, or $HCF_2CF_2OCH_2CH_2CH_2OCF_2CF_2CF_2H$.

The fluorinated ether compound represented by Formula 1 may be, for example, 1,1,2,2-tetrafluoroethyl 2,2,3,3-tetrafluoropropyl ether, or 2,2,3,3,4,4,5,5-octafluoropentyl 1,1,2,2-tetrafluoroethyl ether.

The lithium salt may be any suitable lithium salt including those used to prepare electrolyte in the art. For example, the lithium salt may include at least one of LiSCN, $LiN(CN)_2$, $Li(CF_3SO_2)_3C$, $Li(FSO_2)_2N(LiFSI)$, $LiC_4F_9SO_3$, $LiN(SO_2CF_2CF_3)_2$, $LiPF_3(C_2F_5)_3$, LiCl, LiF, LiBr, LiI, $LiB(C_2O_4)_2$, $LiPF_6$, $LiPF_5(CF_3)$, $LiPF_5(C_2F_5)$, $LiPF_5(C_3F_7)$, $LiPF_4(CF_3)_2$, $LiPF_4(CF_3)(C_2F_5)$, $LiPF_3(CF_3)_3$, $LiPF_3(CF_2CF_3)_3$, $LiPF_4(C_2O_4)$, $LiBF_4$, $LiBF_3(C_2F_5)$, lithium bis(oxalato) borate (LiBOB), lithium oxalyldifluoroborate (LI-ODFB), lithium difluoro(oxalato)borate (LiDFOB), lithium bis(trifluoro methanesulfonyl)imide (LiTFSI, $LiN(SO_2CF_3)_2$), lithium bis(fluorosulfonyl)imide (LiFSI, $LiN(SO_2F)_2$), $LiN(SO_2C_2F_5)_2$, $LiCF_3SO_3$, $LiAsF_6$, $LiSbF_6$, or $LiClO_4$.

The first liquid electrolyte and the second liquid electrolyte may each have a viscosity at 25° C. of about 5 centipoise (cP) or less, or about 3 cP or less, or about 2 cP or less. When the first liquid electrolyte and the second liquid electrolyte have a viscosity within this range, ions may freely migrate in the first liquid electrolyte or the second liquid electrolyte, and ion conductivity may be improved. The first liquid electrolyte and the second liquid electrolyte may each have an ion conductivity at 25° C. of about 1.0 milliSiemens per centimeter (mS/cm) or greater, or about 2 mS/cm ore greater, or about 4 mS/cm or greater, and in some embodiments, about 1 mS/cm to about 10 mS/cm, or about 1 mS/cm to about 5 mS/cm.

In addition to the above-listed organic solvents, the first liquid electrolyte and the second liquid electrolyte may each independently further include at least one of γ-butyrolactone, succinonitrile, adiponitrile, benzonitrile, acetonitrile, tetrahydrofuran, 2-methyltetrahydrofuran, N,N-dimethylformamide, N,N-dimethylacetamide, dimethyl sulfoxide, dioxane, sulfolane, dichloroethane, chlorobenzene, or nitrobenzene.

The composite electrolyte may be, for example, in a gel or semi-solid form. When the composite electrolyte has a gel or semi-solid form, the metal particle may freely expand during charge and discharge, avoiding limitations to expansion present in a solid, and avoiding expansion-related degradation mechanisms.

In an embodiment, the composite electrolyte may be prepared by combining metal particle with the first liquid electrolyte to prepare a composite electrolyte composition, coating the composite electrolyte composition on the anode current collector, and drying the coated composite electrolyte composition.

The anode current collector may be a mesh-type current collector. When using a mesh-type current collector as the anode current collector, the anode current collector may be effectively impregnated with the composite electrolyte. Accordingly, the composite electrolyte may not include a non-woven fabric.

The composite electrolyte composition may be prepared by mixing the metal particle comprising at least one of lithium metal or a lithium metal alloy with a first liquid electrolyte. The composition for forming the composite electrolyte may have a gel or semi-solid form. The composition may have a viscosity at 25° C. of about 90 cP or less, for example, about 80 cP or less, for example, about 60 cP or less, for example, about 50 cP or less, for example, about 30 cP or less, for example, about 10 cP or less, for example, about 5 cP or less, or about 4.5 cP or less, or about 4 cP or less, and in some embodiments, about 1 cP to about 5 cP, or about 2 cP to about 4.5 cP, or about 2.5 cP to about 4 cP, but the viscosity of the composition is not limited thereto.

Optionally, after the coating of the composite electrolyte composition on the anode current collector, a non-woven fabric may be disposed thereon.

Next, the solid electrolyte, a cathode including a cathode active material layer, and a cathode current collector may be disposed on the resulting structure including the composite electrolyte composition on the anode current collector, thereby manufacturing the anodeless lithium metal battery according to an embodiment.

In the anodeless lithium metal battery according to an embodiment, the composite electrolyte may release a lithium ion during discharge, and the lithium ion may migrate to the at least one of lithium metal or a lithium metal alloy in the composite electrolyte during charge, and then be electrodeposited on a surface of the at least one of lithium metal and a lithium metal alloy.

In the lithium metal battery according to one or more embodiments, the lithium from the metal particle including at least one of metal or a lithium metal alloy may be deposited on the anode current collector during charge. The deposited lithium may have an interconnected network structure that is formed upon charge of the anodeless lithium metal battery. Conventional lithium anode thin film do not have a free volume before and after charging, and are expanded upward and downward, resulting in more stress due to dendrite formation. Unlike the lithium anode thin film that may only expand in an upper or lower direction, the metal particle in the anodeless lithium metal battery may expand in a radial direction as shown in FIG. 1C, leading to nearly zero stress, thus improving energy density and reducing an expansion rate of the battery after charging and discharging.

In the anodeless lithium metal battery according to one or more embodiments, the interconnected structure of the lithium metal and/or the lithium alloy may be in the form of a particle or in the form of a layer on a surface of the anode current collector. The interconnected structure of the deposited lithium metal may be in the form of a continuous or discontinuous layer. When the interconnected structure of the lithium metal and/or the lithium alloy forms a layer on the anode current collector, a thickness of the layer may be about 10% or less, and in some embodiments, about 5% or less, and in some other embodiments, about 2% or less, and in still other embodiments, about 1% or less, and in yet other embodiments, about 0.1 to about 10%, or about 0.1 to about 5%, or about 0.1% to about 1%, with respect to a thickness of the cathode.

In the anodeless lithium metal battery according to one or more embodiments, a continuous or discontinuous lithium metal layer may not be formed on the anode current collector after charging and discharging of the anodeless lithium metal battery.

After charge and discharge, the composite electrolyte may contact the negative electrode current collector. Here, a lithium metal layer may be not formed uniformly or not at all between the negative electrode current collector and the composite electrolyte even after charge and discharge.

A contact area between at least one of the lithium metal and the lithium alloy and the first liquid electrolyte of the composite electrolyte may be at least twice the contact area between at least one of lithium metal layer and lithium alloy layer of the same volume and the first electrolyte.

The cathode according to an embodiment may be manufactured in the following manner. For example, a cathode active material, a conducting agent, a binder, and a solvent may be mixed together to prepare a cathode active material layer composition. The cathode active material layer composition may be directly coated on a metallic current collector to prepare a cathode. In some other embodiments, the cathode active material layer composition may be cast on a separate support to form a cathode active material film. The cathode active material film may then be separated from the support and laminated on a metallic current collector, to thereby prepare a cathode. Any suitable cathode may be used, the cathode may be any of a variety of types, and not limited to these examples.

In an embodiment, the cathode active material may be a lithium composite oxide. Any suitable lithium composite oxide may be used. For example, the lithium composite oxide may be a composite oxide of lithium with at least one of a metal of cobalt, manganese, or nickel. In an embodiment, the cathode active material may be a compound represented by: $Li_aA_{1-b}B'_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1.8$, $0 \leq b \leq 0.5$, $0 \leq c \leq 0.05$, and $0 < a < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); $LiFePO_4$, or a combination thereof.

In the above formulae, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as the cathode active material may have a surface coating layer (hereinafter, also referred to as "coating layer"). Alternatively, a combination of a compound without a coating layer and a compound having a coating layer may be used. In an embodiment, the coating layer may include at least one compound of a coating element including an oxide, a hydroxide, an oxyhydroxide, an oxycarbonate, or a hydroxycarbonate of the coating element. In an embodiment, the compounds for forming the coating layer may be amorphous or crystalline. In an embodiment, the coating element for forming the coating layer may be at least one of magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), or zirconium (Zr). In an embodiment, the coating layer may be formed using any method that does not adversely affect the physical characteristics of the cathode active material when a compound of the coating element is used. For example, the coating layer may be formed using spray coating or dipping. Details of such coating methods can be determined by one of skill in the art without undue experimentation, and thus further detailed description thereof will be omitted.

Non-limiting examples of the conducting agent may include: carbon black; graphite particle; natural graphite; artificial graphite; acetylene black; Ketjen black; carbon fiber; carbon nanotube; metal powder, metal fiber or metal tube of copper, nickel, aluminum, and silver; and a conductive polymer such as polyphenylene derivative. However, embodiments are not limited thereto, and any conducting agent suitable for a lithium metal battery may be used. A combination comprising at least one of the foregoing may be used.

Non-limiting examples of the binder may include vinylidene fluoride/hexafluoropropylene copolymers, polyvinylidene fluoride, polyimide, polyethylene, polyester, polyacrylonitrile, polymethyl methacrylate, polytetrafluoroethylene (PTFE), a carboxymethyl cellulose/styrene-butadiene rubber (SMC/SBR) copolymer, a styrene butadiene rubber-based polymer, or a combination thereof. However, embodiments are not limited thereto, and any material suitable for use as a binder in a lithium metal battery may be used.

For example, the solvent may be N-methyl-pyrrolidone, acetone, or water. However, examples of the solvent are not limited thereto. Any suitable material available as a solvent in the art may be used.

The amounts of the cathode active material, the conducting agent, the binder, and the solvent may be determined by those of skill in the art without undue experimentation. At least one of the conducting agent, the binder, and the solvent may be omitted depending on the use and the structure of a lithium metal battery.

The anodeless lithium metal battery according to one or more embodiments may further include a separator.

For example, the separator may be a single-layer structure or a multi-layer structure, including at least one or two layers of polyethylene, polypropylene, polyvinylidene fluoride, or a combination thereof. For example, the separator may be a mixed multilayer structure, such as a two-layer separator of polyethylene/polypropylene, a three-layer separator of polyethylene/polypropylene/polyethylene, or a three-layer separator of polypropylene/polyethylene/polypropylene.

A battery case may have a cylindrical, rectangular, pouch, or thin film shape. For example, the anodeless lithium metal battery according to one or more embodiments may be a lithium ion battery. For example, the anodeless lithium metal battery according to one or more embodiments may be a lithium air battery, a lithium sulfur battery, or the like.

The lithium metal battery according to any of the above-described embodiments may have improved lifetime characteristics and high discharge rate characteristics, and thus may be used in, for example, electric vehicles (EVs). For example, the lithium metal battery may be used in hybrid vehicles such as plug-in hybrid electric vehicles (PHEV) or the like. The lithium metal battery may also be used in the fields where storage of a large amount of power is required. For example, the lithium metal battery may be used in electric bikes, power tools, and the like.

In some embodiments, when a plurality of lithium metal batteries according to one or more embodiments are stacked upon one another, a gel type electrolyte may be arranged between the cathode and the liquid-impermeable ion-conductive composite membrane in each battery. For example, the gel type electrolyte may include a vinylidene difluoride-hexafluoropropylene (VDF-HFP) copolymer, a lithium salt, and an organic solvent.

One or more embodiments of the present disclosure will now be described in detail with reference to the following examples. However, these examples are only for illustrative purposes and are not intended to limit the scope of the one or more embodiments of the present disclosure.

EXAMPLES

Example 1: Anodeless Lithium Metal Battery

After a composition for forming a composite electrolyte was applied onto a copper foil used as an anode current collector, a cellulose non-woven fabric (having a porosity of about 50% and a thickness of about 30 µm) was disposed thereon, and the resulting structure was dried to form the composite electrolyte (having a thickness of about 50 μm) on the copper foil.

The composite electrolyte composition was prepared by mixing 3.5 molar (M) of a first liquid electrolyte with lithium metal powder (having a size of about 50 μm), and the first liquid electrolyte was obtained by mixing lithium bis(fluorosulfonyl)imide (LiFSI) with ethylene glycol dimethylether(1,2-dimethoxyethane: DME). The amount of the lithium metal powder was about 20 parts by weight with respect to 100 parts by weight of a total weight of the composite electrolyte (i.e., a total weight of the lithium salt, the organic solvent, and the lithium metal powder).

A cathode was manufactured as follows.

A liquid electrolyte for the cathode was prepared by mixing 0.4 M of lithium bis(trifluoro methanesulfonyl)imide (LiTFSI), 0.6 M of lithium bis(oxalate)borate (LiBOB), and ethylene carbonate with ethylmethyl carbonate in a volume ratio of about 3:7.

A cathode active material layer composition was obtained by mixing $LiNi_{1/3}Co_{1/3}Mn_{1/3}O_2$, a carbon black conducting agent (Super-P™, Timcal Ltd.), polyvinylidene fluoride (PVdF), and N-methyl pyrrolidone. A weight ratio of $LiNi_{1/3}Co_{1/3}Mn_{1/3}O_2$ to the conducting agent, and to the PVdF in the cathode active material layer composition was about 97:1.5:1.5. The cathode active material layer composition was coated on an aluminum foil (having a thickness of about 15 μm) and then dried at about 25° C. Then, the resulting dried product was further dried under vacuum at about 110° C., thereby manufacturing the cathode.

A solid electrolyte having a thickness of about 90 μm was arranged between the cathode and the composite electrolyte on the anode current collector and assembled together, thereby manufacturing an anodeless lithium metal battery.

A $Li_{1.4}Ti_{1.6}Al_{0.4}P_3O_{12}$ (LTAP) membrane having a thickness of about 90 μm was used as the solid electrolyte. The cathode was arranged on a surface of the solid electrolyte, while the composite electrolyte and the anode current collector were sequentially arranged on the other surface of the solid electrolyte opposite to the cathode. Then, the cathode, the solid electrolyte, the composite electrolyte, and the anode current collector were assembled together, thereby manufacturing the anodeless lithium metal battery.

Example 2: Anodeless Lithium Metal Battery

An anodeless lithium metal battery was manufactured in the same manner as in Example 1, except that a composite membrane containing LTAP and polyvinyl alcohol was used as the solid electrolyte, instead of the LTAP membrane. In the composite membrane containing LTAP and polyvinyl alcohol, the amount of the polyvinyl alcohol was about 68 parts by weight with respect to 100 parts by weight of the composite membrane. The composite membrane had a thickness of about 70 μm and was prepared according to Example 1 of US-2015-0079485-A1, the content of which is incorporated herein by reference in its entirety.

Example 3: Anodeless Lithium Metal Battery

An anodeless lithium metal battery was manufactured in the same manner as in Example 1, except that lithium metal powder having a size of about 20 μm was used to prepare the composite electrolyte.

Examples 4 and 5: Anodeless Lithium Metal Battery

Anodeless lithium metal batteries were manufactured in the same manner as in Example 1, except that the amount of the lithium metal powder was changed to about 1 part by weight and about 50 parts by weight, respectively, with respect to 100 parts by weight of the composite electrolyte.

Examples 6 and 7: Anodeless Lithium Metal Battery

Anodeless lithium metal batteries were manufactured in the same manner as in Example 1, except that 2 M of the first liquid electrolyte and 4 M of the first liquid electrolyte were used, respectively, instead of 3.5 M of the first liquid electrolyte.

Examples 8 and 9: Anodeless Lithium Metal Battery

Anodeless lithium metal batteries were manufactured in the same manner as in Example 1, except that the thickness of the LTAP membrane was changed to about 20 μm and about 45 μm, respectively.

Example 10: Anodeless Lithium Metal Battery

An anodeless lithium metal battery was manufactured in the same manner as in Example 1, except that the composition for forming the composite electrolyte was supplied onto a copper mesh used as the anode current collector, and a cellulose non-woven fabric was not disposed thereon.

Due to the use of the copper mesh used as the anode current collector in Example 10, which may be impregnated with the composition for forming the composite electrolyte, the cellulose non-woven fabric used in Example 1 was not necessary.

Examples 11 and 12: Anodeless Lithium Metal Battery

Anodeless lithium metal batteries were manufactured in the same manner as in Example 1, except that the thickness of the composite electrolyte was changed to about 10 μm and to about 150 μm, respectively.

Comparative Example 1: Anodeless Lithium Metal Battery

A copper foil as an anode current collector was dipped in a 1 M HCl solution for about 10 minutes, washed with distilled water and acetone, and then dried.

A cathode was manufactured in the following manner by coating a thin film of a cathode active material layer composition on an aluminum foil. A liquid electrolyte for the cathode was prepared by mixing 0.4 M LiTFSI, 0.6 M of lithium bis(oxalato)borate (LiBOB), and ethylene carbonate and ethylmethyl carbonate in a volume ratio of about 3:7. The liquid electrolyte was disposed between the cathode and a solid electrolyte described below.

The cathode active material layer composition was prepared by mixing $LiNi_{1/3}Co_{1/3}Mn_{1/3}O_2$, a conducting agent (Super-P, available from Timcal Ltd.), polyvinylidene fluoride (PVdF), and N-methyl pyrrolidone to obtain the cathode active material layer composition. A weight ratio of $LiNi_{1/3}CO_{1/3}Mn_{1/3}O_2$ to the conducting agent to the PVdF in the cathode active material layer composition was about 97:1.5:1.5.

The cathode active material layer composition was coated on the aluminum foil (having a thickness of about 15 μm)

and dried at about 25° C., then further under vacuum at about 100° C. or less, thereby manufacturing the cathode.

The cathode, the liquid electrolyte on the anode current collector, which was prepared above as the anode electrolyte by mixing 3.5 M of lithium bis(fluorosulfonyl)imide (LiFSI) with dimethylether (DME), and the separator (Celgard 2045) were used in manufacturing an anodeless lithium metal battery.

A $Li_{1.4}Ti_{1.6}Al_{0.4}P_3O_{12}$ (LTAP) membrane having a thickness of about 90 μm was used as a solid electrolyte. The cathode was disposed on a surface of the solid electrolyte, while the liquid electrolyte used as the anode electrolyte and the anode current collector were sequentially disposed on the other surface of the solid electrolyte opposite to the cathode. Then, the cathode, the solid electrolyte, the composite electrolyte, and the anode current collector were assembled together, thereby manufacturing the anodeless lithium metal battery.

The liquid electrolyte used as the anode electrolyte in Comparative Example 1 did not contain lithium metal powder, unlike the composite electrolyte of Example 1. In the anodeless lithium metal battery of Comparative Example 1, the liquid electrolyte was prone to reduction due to a potential generated between the lithium and current collector metal during deposition of lithium, and formation of lithium dendrite was facilitated, thus reducing change-discharge efficiency and lifetime of the lithium metal battery.

Comparative Example 2: Lithium Metal Battery

A polyethylene/polypropylene separator (G1212A, available from Asahi) was disposed between a lithium metal anode (having a thickness of about 20 μm) and a cathode, and a 3.5 M of a liquid electrolyte obtained by mixing LiTFSI with dimethylether (DME) as an organic solvent was used.

The cathode was manufactured using a cathode active material layer composition obtained by mixing $LiNi_{1/3}Co_{1/3}Mn_{1/3}O_2$, a conducting agent (Super-P, available from Timcal Ltd.), polyvinylidene fluoride (PVdF), and N-methyl pyrrolidone. A mixed weight ratio of $LiNi_{1/3}Co_{1/3}Mn_{1/3}O_2$ to the conducting agent to PVdF in the cathode composition was about 97:1.5:1.5. The cathode composition was coated on an aluminum foil (having a thickness of about 15 μm) and then dried at about 25° C. Then, the resulting dried product was further dried under vacuum at about 110° C., thereby manufacturing the cathode.

Evaluation Example 1: Impedance Analysis

1) Initial Impedance

Initial impedance characteristics of the lithium metal batteries of Example 1 and Comparative Example 1 were evaluated by measuring resistance using a 2-probe method with an impedance analyzer (Solartron 1260A Impedance/Gain-Phase Analyzer) at about 25° C. in a frequency range of about $10^6$ to 0.1 megahertz (MHz) at a voltage bias of about 10 millivolts (mV).

Figure 6A:
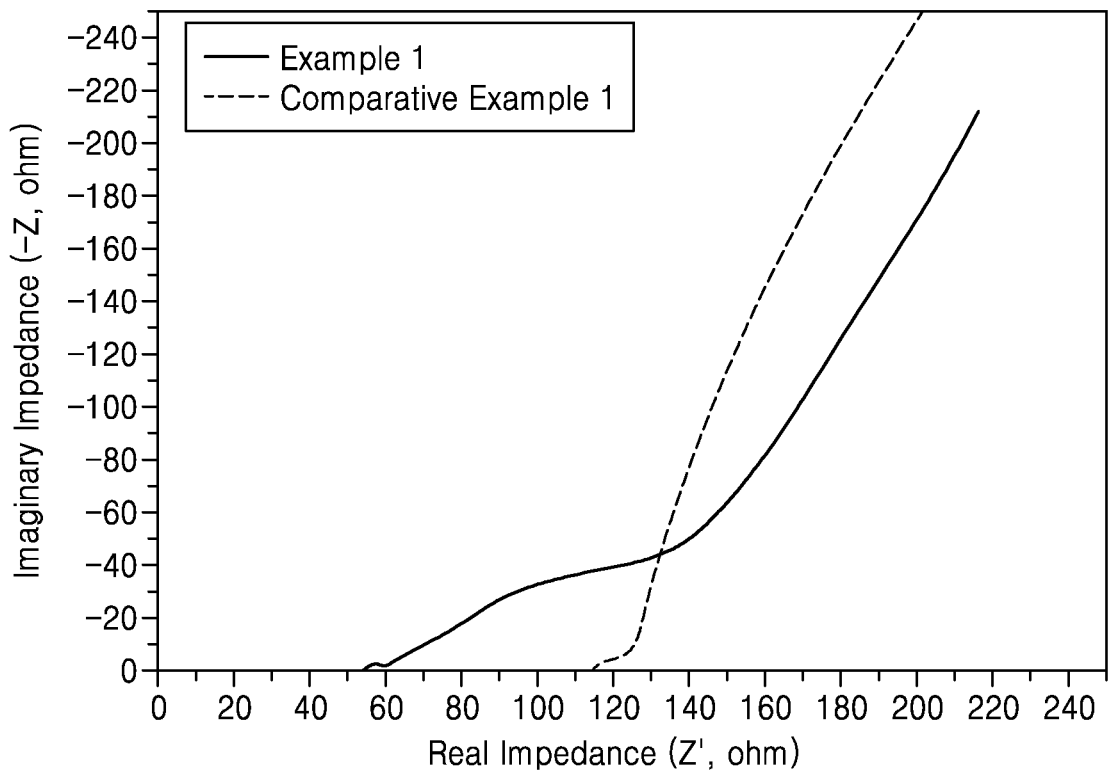
FIG. 6A is a graph of imaginary impedance (−Z, ohm) versus real impedance (Z', ohm), illustrating initial impedance characteristics of the anodeless lithium metal batteries of Example 1 and Comparative Example 1.

Nyquist plots obtained from the results of the impedance measurements that were performed at 24 hours from the manufacture of the anodeless lithium metal batteries of Example 1 and Comparative Example 1 are shown in FIG. 6A. In FIG. 6A, a bulk resistance of an electrode depends from the position and size of a semicircle, and may be represented as a difference between the left x-intercept and the right x-intercept of the semicircle.

Referring to FIG. 6A, the anodeless lithium metal battery of Example 1 was found to have a remarkably reduced bulk resistance, compared to the anodeless lithium metal battery of Comparative Example 1.

2) Impedance after One Cycle

Impedance characteristics after one cycle of the lithium metal batteries of Example 1 and Comparative Example 1 were evaluated in the following manner.

Each of the lithium metal batteries was charged at about 25° C. with a constant current of 0.1 C to a voltage of about 4.30 Volts (V) (with respect to Li), and then with a constant voltage of 4.30 V until a cutoff current of 0.05 C was reached, and was then discharged with a constant current of 0.1 C to a voltage of about 2.8 V (with respect to Li) (Formation process, $1^{st}$ cycle). This charging and discharging process was performed an additional two times to complete the formation process. A C rate is a discharge rate of a cell, and is obtained by dividing a total capacity of the cell by a total discharge period of time of 1 hour, e.g., a C rate for a battery having a discharge capacity of 1.6 amperehours would be 1.6 amperes.

Subsequently, each of the lithium metal batteries was charged at about 25° C. with a constant current of 0.1 C (0.38 milliampere hours per square centimeter (mA/cm²)) to a voltage of about 4.40 V (with respect to Li), and then with a constant voltage of 4.40 V until a cutoff current of 0.05 C was reached. After this charging once, impedance characteristics after a single cycle of each of the lithium metal batteries were evaluated by measuring resistance using a 2-probe method with an impedance analyzer (Solartron 1260A Impedance/Gain-Phase Analyzer) in a frequency range of about $10^6$ to 0.1 MHz, at a voltage bias of about 10 mV at about 25° C. The evaluation results are shown in FIG. 6B.

Figure 6B:
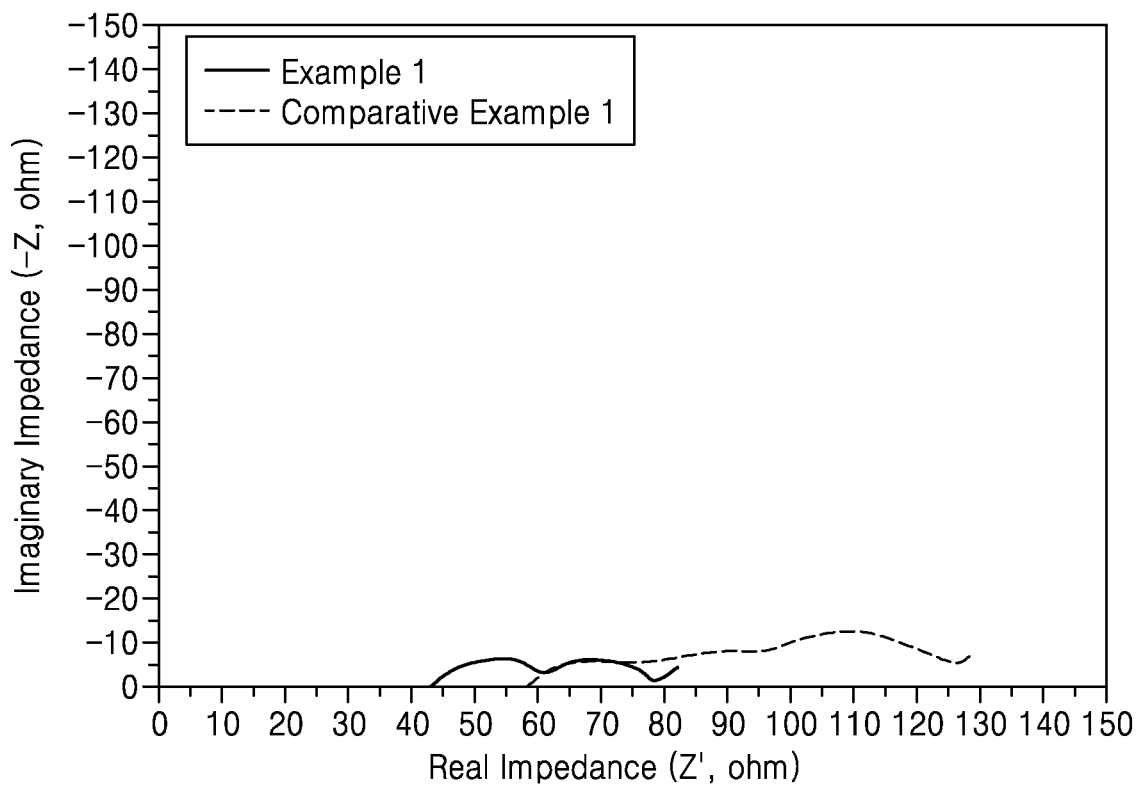
FIG. 6B is a graph of imaginary impedance (−Z, ohm) versus real impedance (Z', ohm), illustrating impedance characteristics after one cycle in the anodeless lithium metal batteries of Example 1 and Comparative Example 1.

Referring to FIG. 6B, the resistance of the anodeless lithium metal battery of Comparative Example 1 was reduced compared to that before charging and discharging after one cycle of charging and discharging, but still increased as compared with the anodeless lithium metal battery of Example 1

Evaluation Example 2: Charge-Discharge Characteristics

The lithium metal batteries of Example 1 and Comparative Examples 1 and 2 were charged at about 25° C. with a constant current of 0.1 C to a voltage of about 4.30 V (with respect to Li), and then with a constant voltage of 4.30 V until a cutoff current of 0.05 C was reached, and were then discharged with a constant current of 0.1 C to a voltage of about 2.8 V (with respect to Li) (Formation process, $1^{st}$ cycle). This charging and discharging process was performed further twice to complete the formation process.

After the formation process, each of the lithium metal batteries was charged at room temperature (25° C.) with a constant current of i) 0.5 C or ii) 1 C in a voltage range of about 3.0 V to 4.4 V (with respect to Li) and then discharged with a constant current of 0.2 C (0.72 mA) until a cutoff voltage of 3.0. V was reached. This charging and discharging cycle was repeated 50 times in total. A Coulombic efficiency was calculated using Equation 1.

Coulombic efficiency (%)=(Discharge capacity of each cycle/Charge capacity of each cycle)× 100%   Equation 1

The evaluation results of the charge-discharge characteristics are shown in FIGS. 2A, 2B, 3A, 3B, 4A, and 4B.

Figure 2A:
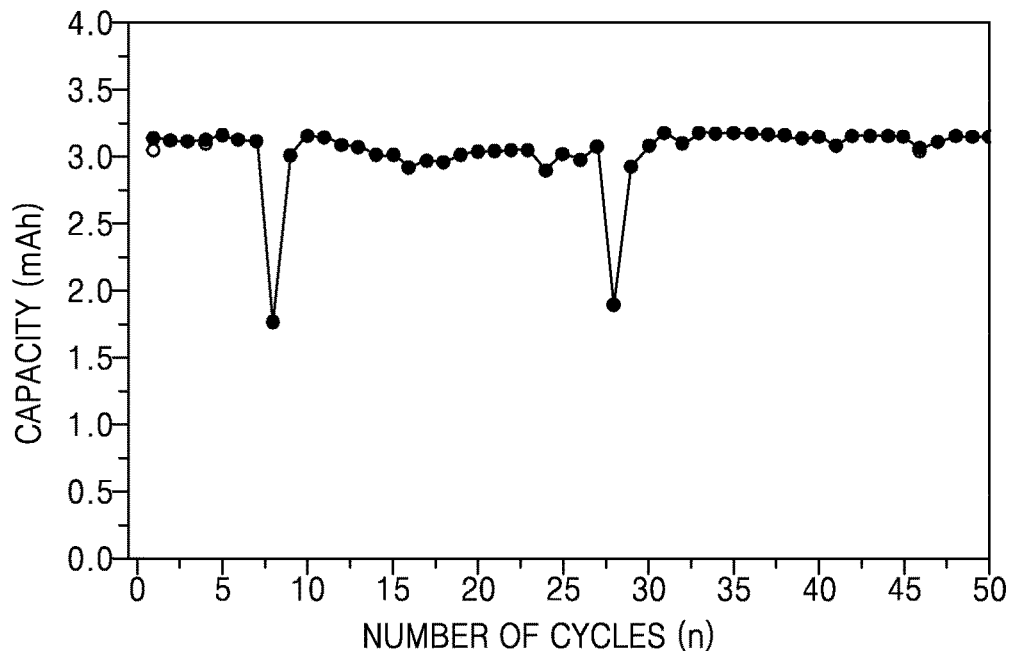
FIG. 2A is a graph of capacity (milliampere-hours, mAh) versus number of cycles (n) in an anodeless lithium metal battery manufactured in Example 1.
Figure 2B:
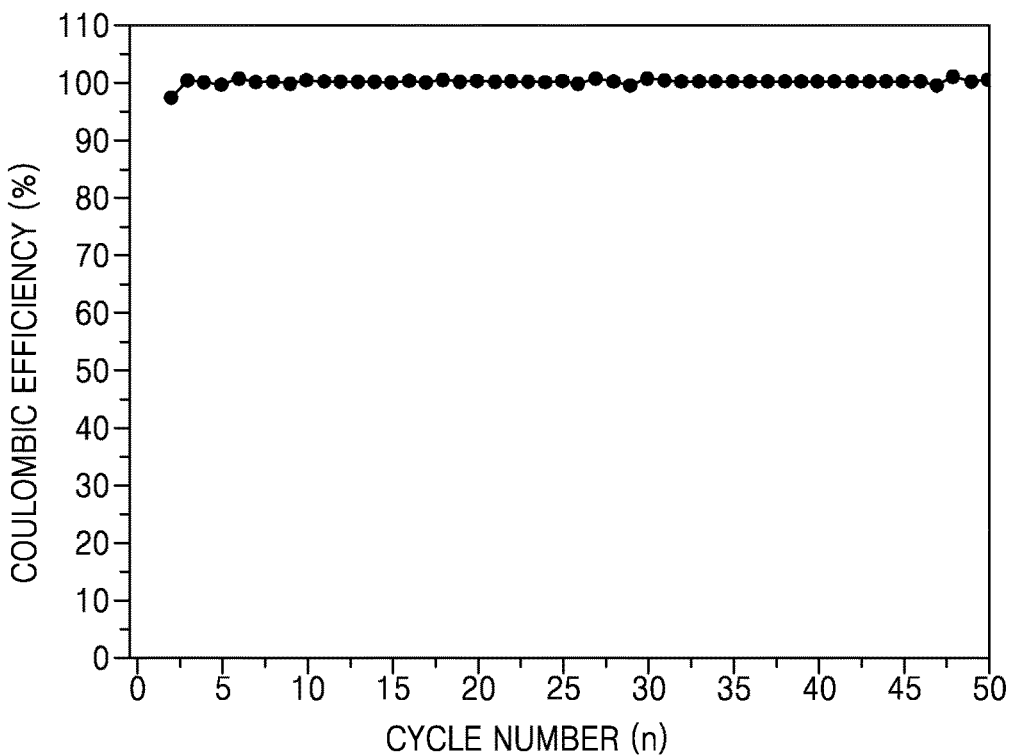
FIG. 2B is a graph of coulombic efficiency (percent, %) versus number of cycles (n), in an anodeless lithium metal battery manufactured in accordance with Example 1.
Figure 3A:
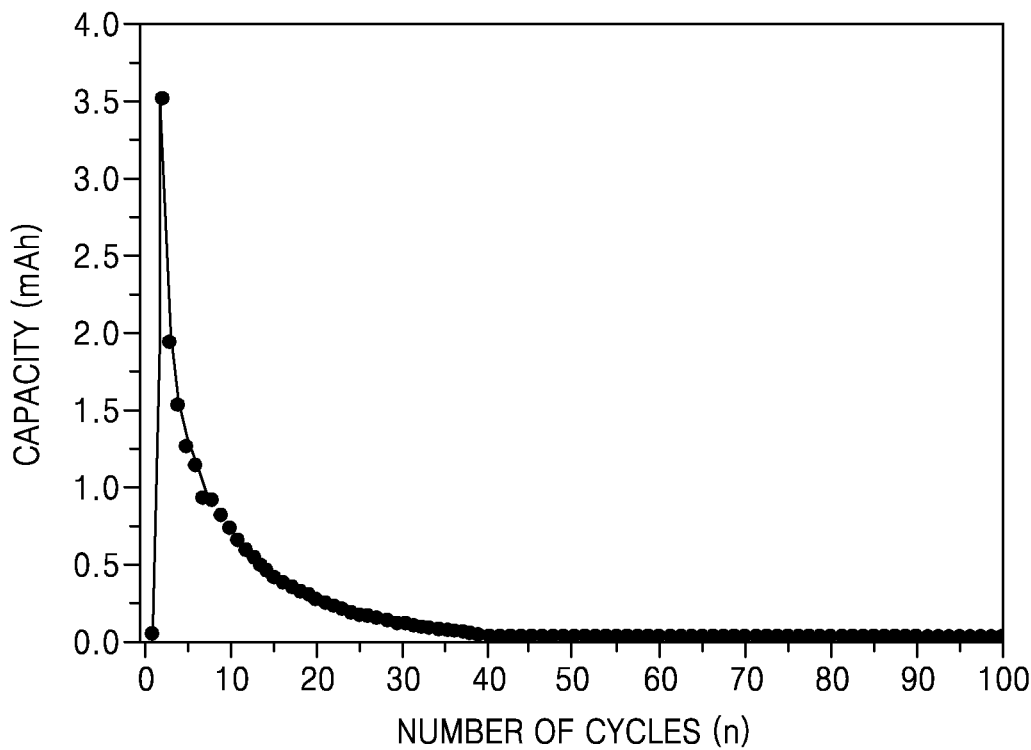
FIG. 3A is a graph of capacity (mAh) versus number of cycles (n) in an anodeless lithium metal battery manufactured in Comparative Example 1.
Figure 3B:
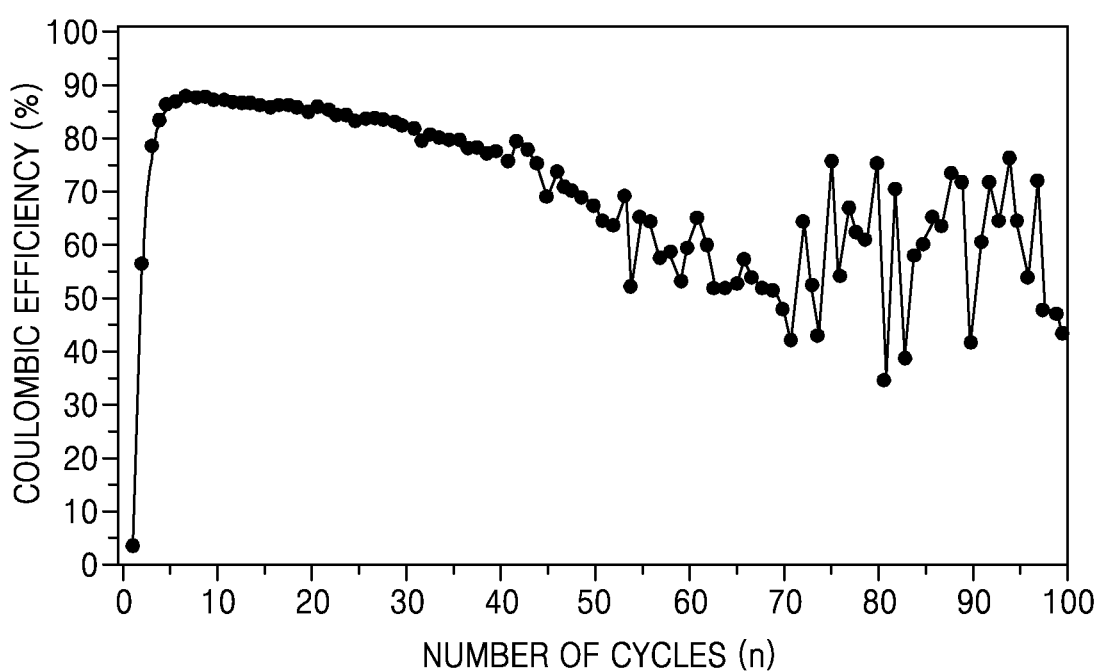
FIG. 3B is a graph of coulombic efficiency (%) versus number of cycles (n) in an anodeless lithium metal battery manufactured in accordance with Comparative Example 1.
Figure 4A:
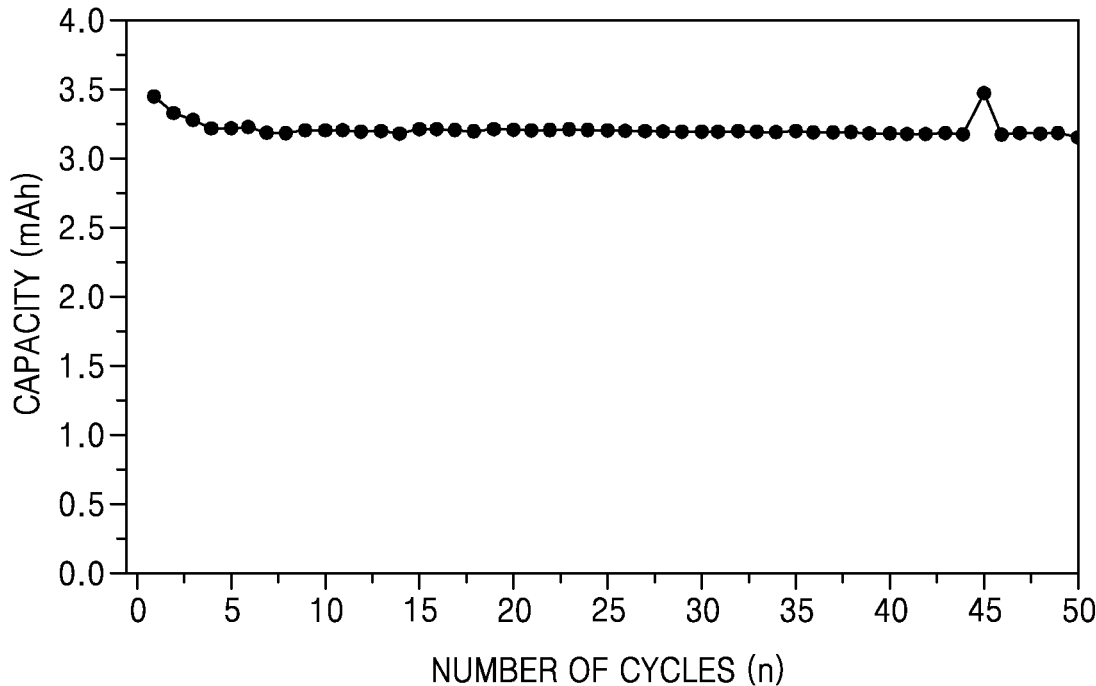
FIG. 4A is a graph of capacity (mAh) versus number of cycles (n) in a lithium metal battery manufactured in Comparative Example 2.
Figure 4B:
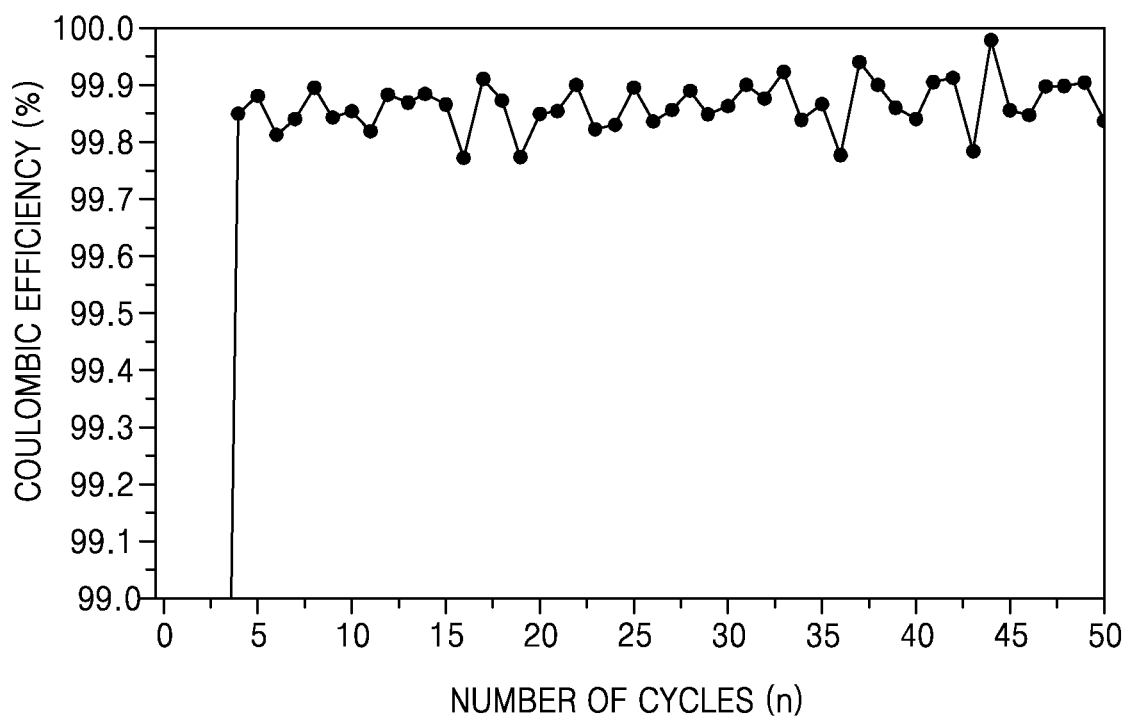
FIG. 4B is a graph of coulombic efficiency (%) versus number of cycles (n) in an anodeless lithium metal battery manufactured in accordance with Comparative Example 2.

FIGS. 2A and 2B show changes in capacity and Coulombic efficiency, respectively, with respect to the number of cycles in the anodeless lithium metal battery of Example 1. FIGS. 3A and 3B show changes in capacity and Coulombic efficiency, respectively, with respect to the number of cycles in the anodeless lithium metal battery of Comparative Example 1. FIGS. 4A and 4B show changes in capacity and Coulombic efficiency, respectively, with respect to the number of cycles in the lithium metal battery of Comparative Example 2.

Referring to FIGS. 3A and 3B, the anodeless lithium metal battery of Comparative Example 1 was found to have a charge and discharge efficiency (Coulombic efficiency) of less than 90% and a reduced capacity retention of less than 50% in 10 cycles.

Referring to FIGS. 4A and 4B, the lithium metal battery of Comparative Example 2 was found to maintain a Coulombic efficiency (charge and discharge efficiency) of about 99.8% and a capacity retention of about 93% after 50 cycles at 0.5 C. Referring to FIGS. 2A and 2B, the anodeless lithium metal battery of Example 1 was found to maintain a good charge and discharge efficiency and to have no reduction in capacity retention in 50 cycles at 0.5 C.

Charge and discharge characteristics of the anodeless lithium metal batteries of Examples 2 to 12 were evaluated using the same method as applied to the anodeless lithium metal battery of Example 1.

As a result of the evaluation, the anodeless lithium metal batteries of Examples 2 to 12 were found to have equivalent or similar charge and discharge characteristics to those of the anodeless lithium metal battery of Example 1.

Evaluation Example 3: Rate Capability

Rate capabilities of the lithium metal batteries of Example 1 and Comparative Example 2 were evaluated using the following method.

Each of the lithium metal batteries of Example 1 and Comparative Example 2 was charged with a constant current (0.2 C) and a constant voltage (4.3V, 0.05 C cut-off). After a rest for about 10 minutes, the lithium metal batteries were discharged with a constant current (0.1 C, 0.5 C, or 1 C) until a voltage of about 3.0V was reached. In particular, with periodic changing of the discharge rate to 0.1 C, 0.5 C, or 1 C at every increase in charge and discharge cycle number, high-rate discharge characteristics (referred to also as "rate capability") of each lithium metal battery was evaluated. During $1^{st}$ to $3^{rd}$ charge and discharge cycles, each coin cell was discharged at a rate of 0.1 C. A rate capability of each coin half cell was defined by Equation 2.

Rate capability [%]=(Discharge capacity when discharged at a specific constant current)/(Discharge capacity when discharged at a discharge rate of 0.1 C)×100%   Equation 2

Figure 5:
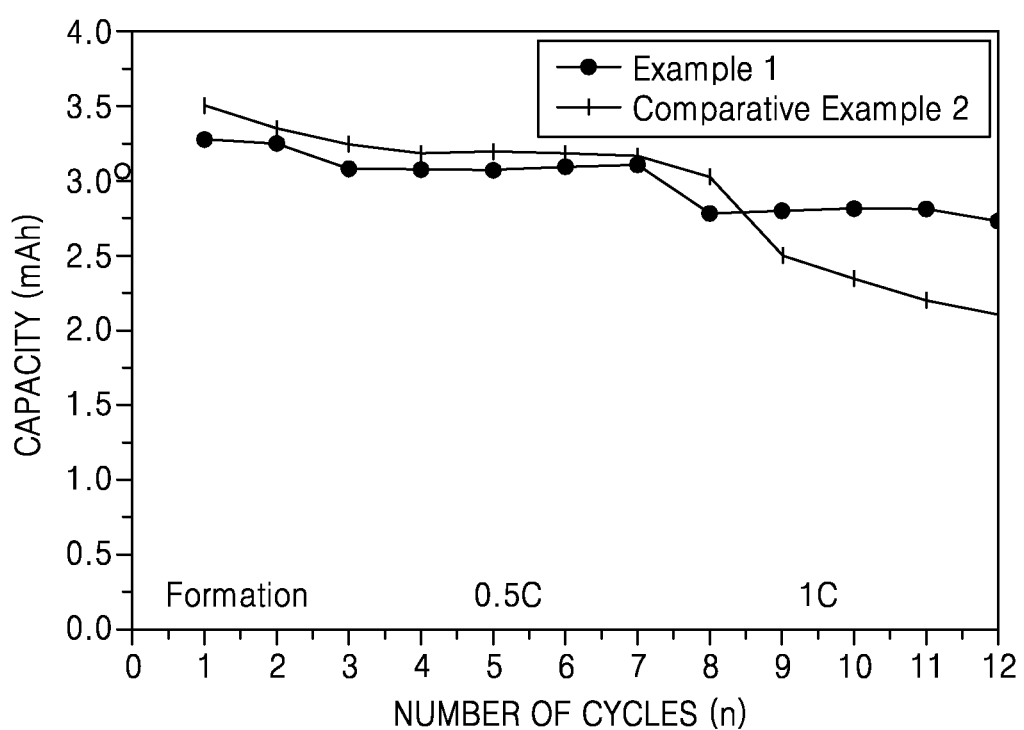
FIG. 5 is a graph of capacity (mAh) versus number of cycles (n) showing rate capability of the lithium metal batteries of Example 1 and Comparative Example 2.

The evaluation results are shown in FIG. 5.

Referring to FIG. 5, the anodeless lithium metal battery of Example 1 was found to have similar capacity characteristics at 0.5 C to those of the lithium metal battery of Comparative Example 2. However, the anodeless lithium metal battery of Example 1 had remarkably improved capacity characteristics at 1.0 C or greater, compared to those of the lithium metal battery of Comparative Example 2.

As described above, according to the embodiment, an anodeless lithium metal battery having improved energy density and lifetime characteristics may be manufactured.

It should be understood that embodiments described herein should be considered in a descriptive sense only and not for purposes of limitation. Descriptions of features, advantages, or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A charged lithium metal battery comprising:
   a cathode comprising a cathode current collector and a cathode active material layer on the cathode current collector;
   an anode current collector, wherein the anode current collector is a mesh current collector;
   a composite electrolyte between the cathode and the anode current collector; and
   a solid electrolyte disposed between the composite electrolyte and the cathode;
   wherein the composite electrolyte comprises a first electrolyte comprising a lithium salt and a first solvent and an interconnected network structure disposed on a surface of the anode current collector, the interconnected structure comprising a plurality of connected metal particles, each metal particle comprising a core of at least one of lithium or lithium metal alloy and lithium from the lithium salt is electrodeposited on a surface of the core of the metal particles, wherein the electrodeposited lithium connects the metal particles to form a layer.

2. The charged lithium metal battery of claim 1, wherein the electrodeposited lithium connecting the metal particles form the interconnected network structure layer, the layer having a thickness of about 0.1% to about 10% of a thickness of the cathode.

3. The charged lithium metal battery of claim 1, wherein an amount of the metal particles in the composite electrolyte is 1 part by weight to 50 parts by weight, with respect to 100 parts by weight of a total weight of the composite electrolyte.

4. The charged lithium metal battery of claim 1, wherein the first solvent comprises at least one selected from the group consisting of an ether compound and a sulfone compound.

5. The charged lithium metal battery of claim 4, wherein the first solvent comprises the ether compound, and the ether compound is at least one selected from the group consisting of a glyme compound, a dioxolane compound, and a fluorinated ether compound.

6. The charged lithium metal battery of claim 5, wherein the glyme compound is at least one selected from the group consisting of ethylene glycol dimethylether, ethylene glycol diethylether, propylene glycol dimethylether, propylene glycol diethylether, butylene glycol dimethylether, butylene glycol diethylether, diethylene glycol dimethylether, triethylene glycol dimethylether, tetraethylene glycol dimethylether, diethylene glycol diethylether, triethylene glycol diethylether, tetraethylene glycol diethylether, dipropylene glycol dimethylether, tripropylene glycol dimethylether, tetrapropylene glycol dimethylether, dipropylene glycol diethylether, tripropylene glycol diethylether, tetrapropylene glycol diethylether, dibutylene glycol dimethylether, tributylene glycol dimethylether, tetrabutylene glycol dimethylether, dibutylene glycol diethylether, tributylene glycol diethylether, and tetrabutylene glycol diethylether, the dioxolane compound is at least one selected from the group consisting of 1,3-dioxolane, 4,5-dimethyl-1,3-dioxolane, 4,5-diethyl-1,3-dioxolane, 4-methyl-1,3-dioxolane, 4-ethyl-1,3-dioxolane, 2-methyl-1,3-dioxolane, 2-vinyl-1,3-dioxolane, 2,2-dimethyl-1,3-dioxolane, and 2-ethyl-2-methyl-1,3-dioxolane, and the fluorinated ether compound is at least one selected from the group consisting of 1,1,2,2-tetrafluoroethyl 2,2,3,3-tetrafluoropropyl ether, and 2,2,3,3,4,4,5,5-octafluoropentyl 1,1,2,2-tetrafluoroethyl ether.

7. The charged lithium metal battery of claim 1, wherein the cathode active material layer further comprises a second electrolyte comprising a lithium salt and a second solvent, and the second solvent comprises at least one selected from the group consisting of an ether compound, a sulfone compound, and a carbonate compound, wherein the first electrolyte has a composition that is the same or different than a composition of the second electrolyte.

8. The charged lithium metal battery of claim 4, wherein the first solvent comprises the at least one sulfone compound selected from the group consisting of dimethyl sulfone, diethyl sulfone, and ethylmethyl sulfone.

9. The charged lithium metal battery of claim 1, wherein composite electrolyte has a kinematic viscosity at 25° C. of 1 centipoise to 30 centipoise or less.

10. The charged lithium metal battery of claim 1, wherein the first electrolyte has a kinematic viscosity at 25° C. of 1 centipoise to 5 centipoise or less.

11. The charged lithium metal battery of claim 1, wherein the composite electrolyte further comprises a non-woven fabric supporting the metal particles.

12. The charged lithium metal battery of claim 11, wherein the non-woven fabric comprises at least one selected from the group consisting of cellulose, polyester, polyetherimide, polyethylene, polypropylene, polyethylene terephthalate, polybutylene terephthalate, polyamide, polyacetal, polycarbonate, polyimide, polyether ketone, polyether sulfone, polyphenylene oxide, polyphenylene sulfide, polyethylene naphthalate, polytetrafluoroethylene, polyvinylidene fluoride, polyvinyl chloride, polyacrylonitrile, nylon, and polypara-phenylene benzobisoxazole.

13. The charged lithium metal battery of claim 1, wherein a concentration of the lithium salt in the first electrolyte is about 1 molar to about 8 molar.

14. The charged lithium metal battery of claim 13, wherein the concentration of the lithium salt in the first electrolyte is about 2 molar to about 5 molar.

15. The charged lithium metal battery of claim 13, wherein the lithium salt comprises at least one selected from the group consisting of LiSCN, $LiN(CN)_2$, $Li(CF_3SO_2)_3C$, $Li(FSO_2)_2N(LiFSI)$, $LiC_4F_9SO_3$, $LiN(SO_2CF_2CF_3)_2$, $LiPF_3(C_2F_5)_3$, LiCl, LiF, LiBr, LiI, $LiB(C_2O_4)_2$, $LiPF_6$, $LiPF_5(CF_3)$, $LiPF_5(C_2F_5)$, $LiPF_5(C_3F_7)$, $LiPF_4(CF_3)_2$, $LiPF_4(CF_3)(C_2F_5)$, $LiPF_3(CF_3)_3$, $LiPF_3(CF_2CF_3)_3$, $LiPF_4(C_2O_4)_2$, $LiBF_4$, $LiBF_3(C_2F_5)$, lithium bis(oxalato) borate, lithium oxalyldifluoroborate, lithium difluoro (oxalato) borate, lithium bis(trifluoro methanesulfonyl)imide, $LiN(SO_2CF_3)_2$, lithium bis(fluorosulfonyl)imide, $LiN(SO_2F)_2$, $LiN(SO_2C_2F_5)_2$, $LiCF_3SO_3$, $LiAsF_6$, $LiSbF_6$, and $LiClO_4$.

16. The charged lithium metal battery of claim 1, wherein the solid electrolyte layer is selected from the group consisting of an inorganic solid electrolyte material, an organic solid electrolyte material, and an organic/inorganic composite solid electrolyte material.

17. The charged lithium metal battery of claim 16, wherein the inorganic solid electrolyte material is at least one selected from the group consisting of a glassy active metal ionic conductor, an amorphous active metal ionic conductor, a ceramic active metal ionic conductor, and a glass-ceramic active metal ionic conductor, the organic solid electrolyte material is at least one selected from the group consisting of a polyethylene derivative, a polyethylene oxide derivative, a polypropylene oxide derivative, a phosphoric acid ester polymer, polyester sulfide, polyvinyl alcohol, and polyvinylidene fluoride; and the organic/inorganic composite electrolyte material comprises the organic solid electrolyte material and the inorganic solid electrolyte material.

18. The charged lithium metal battery of claim 1, wherein the metal particle comprises the lithium metal.

19. The charged lithium metal battery of claim 1, wherein the metal particle has a size of about 5 micrometers to about 50 micrometers.

* * * * *